Figure 1:
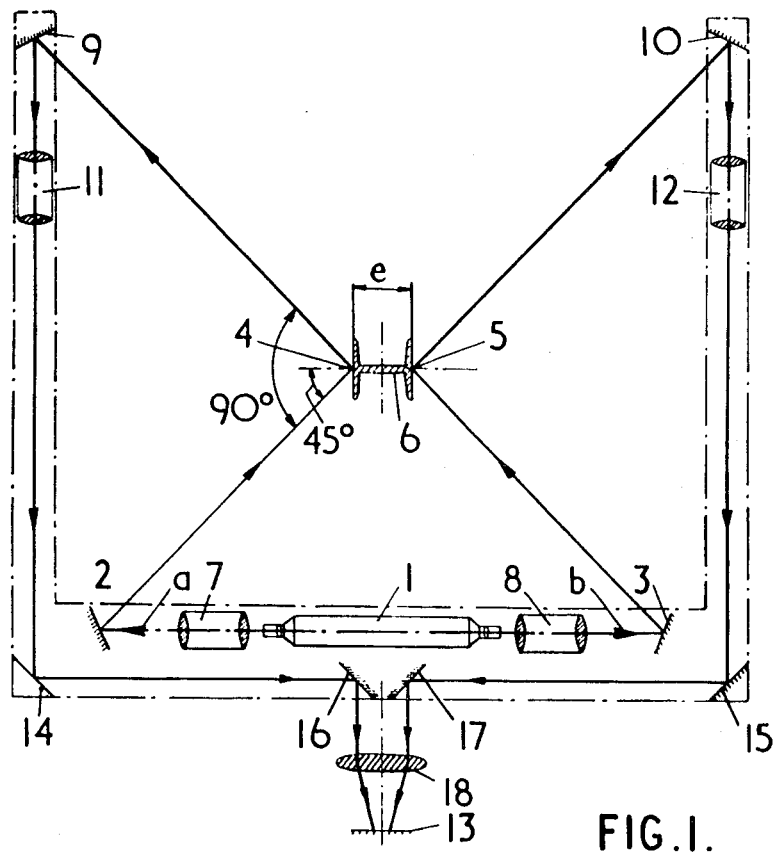

United States Patent [11] 3,619,070

| [72] | Inventor | Robert Alfred Pirlet |
| | | Angleur, Belgium |
| [21] | Appl. No. | 726,946 |
| [22] | Filed | May 6, 1968 |
| [45] | Patented | Nov. 9, 1971 |
| [73] | Assignee | Centre National De Recherches |
| | | Metallurgiques |
| | | Brussels, Belgium |
| [32] | Priorities | May 5, 1967 |
| [33] | | Luxembourg |
| [31] | | 53,596; |
| | | Dec. 15, 1967, Belgium, No. 708,100 |

[54] METHOD AND APPARATUS FOR MEASURING THICKNESS
27 Claims, 4 Drawing Figs.

[52] U.S. Cl. ............................................. 356/163,
 250/219 TH, 356/156, 356;164/
[51] Int. Cl. ........................................ G01b 11/06
[50] Field of Search ............................... 356/156,
 158, 163, 212, 167, 211, 108, 209, 164, 165, 171;
 250/219 TH

[56] References Cited
UNITED STATES PATENTS

| 1,451,302 | 4/1923 | Mihalyi .................... | 356/163 |
| 2,351,770 | 6/1944 | Koenig ..................... | 356/156 |
| 2,629,936 | 3/1953 | Cronstedt ................. | 356/167 |
| 2,747,284 | 5/1956 | Christoph ................. | 356/156 |
| 3,016,464 | 1/1962 | Bailey ...................... | 356/1 |
| 3,174,392 | 3/1965 | Räntsch .................... | 356/156 |
| 3,187,185 | 6/1965 | Milnes ...................... | 356/156 |

FOREIGN PATENTS

| 991,165 | 1951 | France ..................... | 356/163 |
| 396,425 | 1966 | Switzerland .............. | 356/156 |
| 258,392 | 1963 | Australia ................... | 356/156 |
| 177,634 | 1966 | U.S.S.R. ................... | 356/163 |
| 891,348 | 1962 | Great Britain ............. | 356/163 |

Primary Examiner—Ronald L. Wibert
Assistant Examiner—J. Rothenberg
Attorney—Holman & Stern ABSTRACT: A method for measuring the thickness of a body, characterized in that on each side of the body whose thickness is to be measured one point is selected, the points being situated on a common normal to the median plane of the material or substantially in proximity to such a normal, these two points being such that the planes tangential to the walls of the body at these points are substantially parallel. Optical rays are directed towards each of these points, and a high proportion of the rays emanating from these points are collected in the form of two distinct beams. These beams are subsequently oriented towards a common plane and the distance between the images resulting from the intersection of these beams with the plane is measured by a suitable means, this distance being indicative of the thickness being measured.

PATENTED NOV 9 1971        3,619,070

SHEET 1 OF 2

INVENTOR
ROBERT A. PIRLET
BY *Blascock, Downing & Seebold*
ATTORNEYS

METHOD AND APPARATUS FOR MEASURING THICKNESS

The present invention relates to a method and apparatus for measuring thickness, in particular, the thickness of relatively thick metallurgical products such as for example slabs, girders and sections.

The thickness of relatively thin metallurgical products such as thin sheets is frequently measured with the aid of X-rays or gamma rays, utilizing methods mainly based on the effects of the absorption of these rays by the products to be measured.

As the thickness of the products to be measured increases, the absorption of the X-rays or gamma rays also increases. This necessitates the use of correspondingly more and more intense rays, with consequently greater costs due to the higher power consumption and a certain danger in view of the nature and the intensity of the rays employed.

Moreover, it is to be noted that the methods based on these absorption phenomena are only suitable for measuring the solid portions of the products concerned. Thus, in the case of pipes, only the thickness of the pipe walls can be measured, and not their external diameter. Difficulties of the same kind arise in the case of T- or U-shaped girders and sections, and in general with all products comprising hollow portions.

Furthermore, the results of the measurements carried out by such methods are influenced by the density of the material whose thickness is to be measured; hence the necessity of applying these methods to products which are as homogenous as possible and free of internal defects such as blisters and inclusions.

These circumstances tend to restrict the field of application of X-rays and gamma rays, whose practical importance is thus confined to the measurement of the thickness of relatively thin products.

The present invention has as an object a method for measuring the thickness of bodies, particularly in cases where the application of X-rays or gamma rays would be difficult or costly, i.e. in the case of products such as slabs, tubes and sections.

The method, according to the invention, is based on the diffusive and reflecting properties of the walls of the bodies to be measured when the walls are exposed to the impact of optical rays, i.e. rays with wavelengths between 0.12 micron and 40 microns.

The method according to the present invention is characterized in that on each side of the body whose thickness is to be measured one point is selected, the points being situated on a common normal to the median plane of the material or substantially in proximity to such a normal. These two points are such that the planes tangential to the walls of the body at these points are substantially parallel, and optical rays are directed towards each of these points. A high proportion of the rays emanating from these points are collected in the form of two distinct beams and these beams are subsequently oriented towards a common plane. The distance between the images resulting from the intersection of these beams with the common plane is measured by a suitable means and this distance is indicative of the thickness being measured.

The paths of the optical rays passing through each of the two points selected to determine the thickness of the body in question are such, that in the case where the body to be measured is displaced relative to its usual position, the images representing the points each undergo a displacement of identical amplitude and direction.

It is possible, for example in a rolling mill, for the strips to be moved laterally as well as longitudinally which means that the location of the two points relative to the longitudinal edge of the strip is changed. The instant invention can accommodate this contingency.

According to the invention, the axis of capture may be symmetrical with the axis of incidence relative to the normal to the body passing through the points of incidence of the optical rays or, according to different embodiment, the axis of incidence may be perpendicular to the body to be measured at the points of impact of the optical rays.

Furthermore according to the invention, the optical rays are focused on each of the two points selected for determining the thickness of the body to be measured, which makes it possible to reduce the impact area of the rays on the body and to increase the density of the luminous energy. For this same purpose of increasing the density of the luminous energy applied during the measurement, directed optical rays are employed.

According to another features of the invention, monochromatic optical rays are employed, which makes it possible to distinguish more easily, for example with the aid of interference filters the laser radiation retransmitted by the surface of the body from among the rays emitted by the body in question.

For the purpose of reducing the intersection surface of the beams coming from the two selected points, with the plane towards which they are oriented, the beams are focused on the plane in question.

The distance between the images resulting from the intersection of the beams coming from the body to be measured with the plane towards which they are oriented can be measured in various ways for example:

- by placing a graduated reticle in the plane and counting the number of divisions located between the two images;
- by capturing these images and displaying them on a graduated reticle. The advantage of this method is that the observer can carry out his measurements in a location selected for this purpose;
- by capturing these images and displaying them on the photosensitive surface of a television screen. The time required by the electronic scanning to pass from one image to the other is measured and this measure of time is connected into a measure of thickness;
- by capturing these images and displaying them on photosensitive surface of a television screen and in this embodiment the specific line is a vertical line. Continuous electronic scanning of this whole screen is carried out and the time required by the electronic scanning to pass from one image to the other is measured and this measure of time is converted into a measure of thickness.

In the case where the body to be measured is at a higher temperature than its environment, a flow of air will be maintained along the path of the optical rays directed towards the body to be measured and of those emanating therefrom, in such a manner, that the rays pass through a medium of uniform refractive index. It is known that if optical rays do not propagate in a medium of uniform refractive index, their motion ceases to be rectilinear and the resulting measurements would be erroneous.

The present invention also relates to an apparatus for carrying out the aforedescribed method.

According to the invention, the apparatus for measuring the thickness of a body is essentially characterized in that it comprises an optical ray emitter, means for directing the optical rays to the two points selected for determining the thickness of the body, means for capturing in the form of two distinct beams the rays emanating from each of these two points, means for rendering parallel to each other all rays constituting each of these two beams, means for directing these two beams towards a common plane and means for measuring the distance between the two images resulting from the intersection of these beams with the common plane.

The optical ray emitter may be constituted by two lasers of substantially equal power, or of a single laser whose two mirrors have the same transmissivity coefficient, resulting in the emission of two rays of substantially equal power. The use of a single laser followed by a mirror or prism separator which divides the emitted radiation in two beams of equal power is well known and is also possible within the scope of the invention.

The means for directing the rays to each of the two points selected for determining the thickness of the body to be measured may of course be mirrors, lenses or prisms.

In the case where the rays are focused on each of the two points selected for determining the thickness of the body to be measured, the means for directing the rays are constituted either by focusing mirrors or by plane mirrors combined with lenses or objectives, the focal points of these means coinciding with the reference points of the body to be measured.

The means for collecting in the form of two distinct beams the rays emanating from each of the two points selected for determining the thickness of the body to be measured and for rendering parallel to each other all rays constituting each of these beams consist either of mirrors with a focus as large as possible, or of plane mirrors combined with lenses or objectives having an aperture as large as possible.

In the case where the rays emanating from the body to be measured are focused in order to reduce the area of the surface of intersection of the rays with the plane towards which they are directed, the means for orienting said rays towards the plane consist of plane mirrors combined with lenses whose focus is located in the plane.

The means for measuring the distance between the images resulting from the intersection of the beams emanating from the body to be measured with the plane towards which the beams are directed consist of a viewer with micrometric reticle eyepiece, or of a television camera and a suitable screen.

Figure 2:
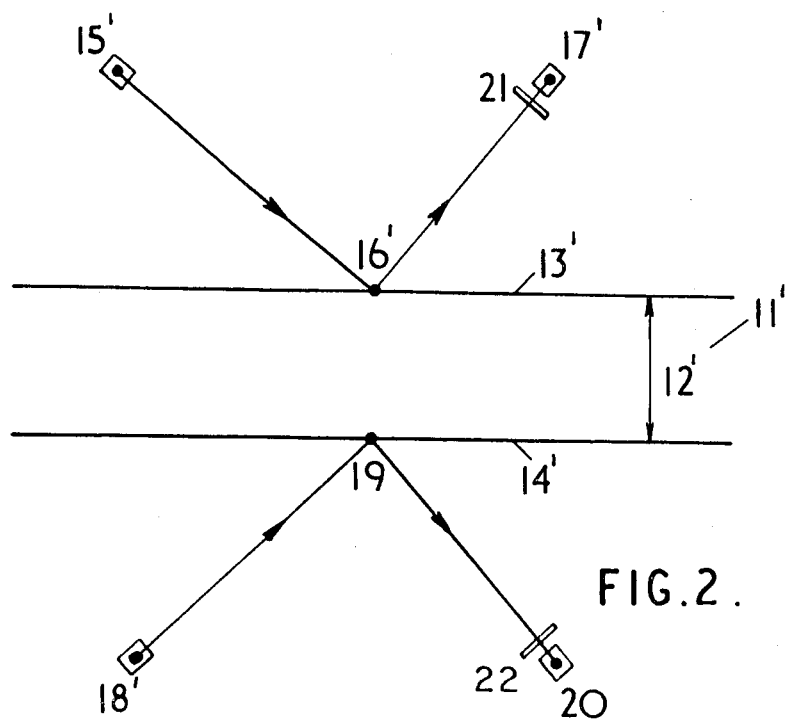
Figure 3:
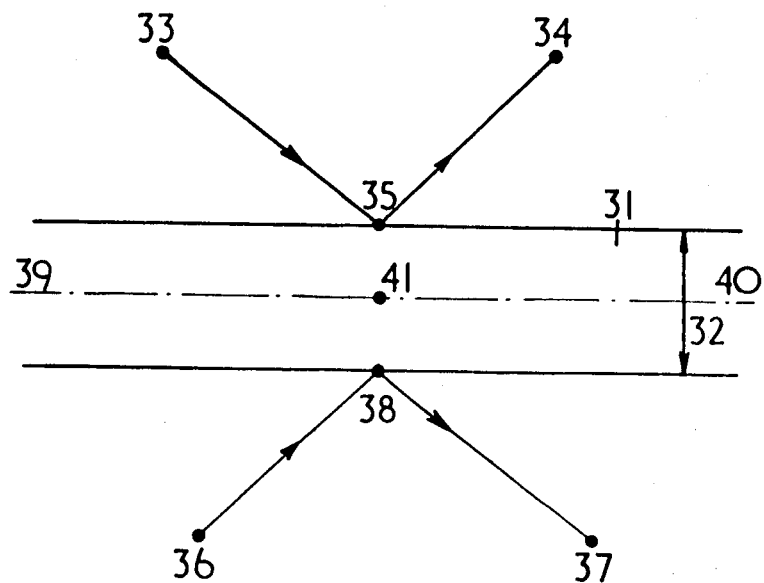
Figure 4:
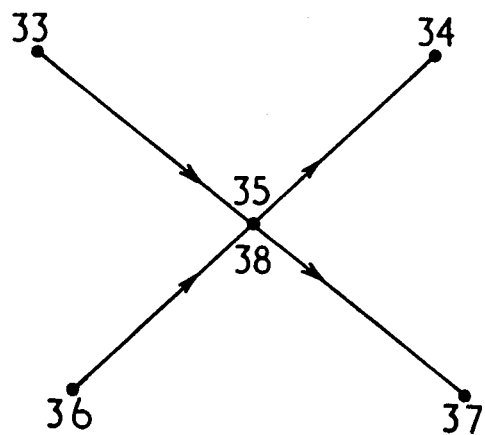

The invention will now be described with reference to the accompanying drawings, which illustrate the invention but in no restrictive sense, in which:

FIG. 1 illustrates one form of embodiment of the apparatus for carrying out the method according to the invention;

FIG. 2 relates to a modified form of execution of the method according to the invention;

FIG. 3 relates to an application of the form of execution referred to in FIG. 2; and FIG. 4 is a variant of the method of FIG. 3.

The laser apparatus 1 shown in FIG. 1 emits two beams *a* and *b* of substantially equal intensity, which are directed by means of the plane mirrors 2 and 3 towards the points 4 and 5 selected to determine the thickness *e* of the body 6 to be measured. The lenses 7 and 8 are arranged in such a manner, that their foci coincide with the points 4 and 5 respectively. The rays *a* and *b* are directed respectively towards the points 4 and 5, in such a manner, that the angle of incidence of these rays on the walls where the points 4 and 5 are located equals 45°.

The plane mirrors 9 and 10 effect the capture of the rays emanating from each of the points 4 and 5 along an axis symmetrical with the axis of incidence relative to the perpendicular to the body passing through said points. In the case of the present example, the angle of incidence is 45°, and the angle formed between the axis of incidence and the axis of capture is 90°. The lenses 11 and 12, combined with the plane mirrors 9 and 10 are located in such a manner, that their foci coincidence respectively with the point 4 and the point 5. The size of these lenses 11 and 12 are as large as possible to allow them to capture the greatest possible number of rays emanating from the body to be measured. These lenses 11 and 12 also make it possible to render parallel to each other all the constituting rays of each of the two collected beams.

On leaving the lenses 11 and 12, the beams of the rays emanating from the body to be measured are directed towards a plane 13, by means of a set of mirrors 14, 15, 16, 17. These beams are moreover focused on the plane 13 by means of the lens 18. The distance separating the images resulting from the intersection of the two beams with the plane 13 is a measure of the distance between the points 4 and 5, i.e. of the thickness of the body to be measured.

Whatever the relative positions of the images resulting from the intersection of the beams with the plane 13, these positions may be exploited in several different ways to deduce therefrom the thickness of the body to be measured. For example, a scaled crossline or reticle system may be placed into the plane 13, and the number of scale divisions between the two images can be read off with the aid of an eyepiece.

When the products whose thickness is to be measured have a great volume and a correspondingly large working surface, the distances between the elements of the optical apparatus and the number of these elements must be increased. This can then lead to acute stability problems regarding these elements, owing to the greater complexity of the assembly used. It is well known that the stability of the elements of an optical device is always unfavorably affected by mechanical vibrations, thermal expansion, etc., which are impossible to avoid during the measurement of the thickness of the products concerned.

An advantageous variant of the method according to the invention enables in particular the measurement of the thickness of such products to be carried out with a relatively small number of optical elements and, consequently, with a greater precision.

According to the example of FIG. 2, this modified form of execution of the method according to the invention is essentially characterized in that optical rays are emitted in a well-defined direction by an emitter 15' towards a suitable point 16' of face 13' of the product 11', whose thickness 12' is to be measured, and that by means of a television camera 17' a high proportion of the rays retransmitted by said point 16' are collated, the same method being applied simultaneously to the opposite face 14' of the product 11' at point 19, by means of the emitter 18' and the television camera 20, the point 19 being separated from the point 16' by a distance equaling the thickness 12' to be measured. The optical circuits 15', 16', 17' and 18', 19, and 20 formed on wither side of the product 11' by the corresponding axes of emission and reception are superposable. The rays retransmitted from the points of incidence 16' and 19 to the television cameras 17' and 20 traverse a focal optical system 21 and 22 in such a manner, for example, that the sensitive face of each camera is located in the image focal plane of the optical system associated therewith. The images are formed in a well-defined portion of said sensitive face and a temporal correspondence is maintained between the scanning of the sensitive face of each of the two cameras which makes it possible to locate, by electronic counting, the position of the images on the sensitive faces and to calculate therefrom the thickness of the product.

The emission and reception axes of the optical rays situated on either side of the product whose thickness is to be measured are advantageously symmetrical relative to the median plane of the product, perpendicular to the direction of the thickness to be measured.

According to an advantageous variant of the invention, the emission and reception axes of the optical rays are symmetrical relative to a a point judiciously selected in the median plane of the body, perpendicular to the direction of the thickness to be measured.

The above-described method may be employed for verifying the position and the orientation of all elements of an optical system. In the example of the FIG. 3, there is a product 31 whose thickness 32 is to be measured. On one side of the product 31, the emitter is placed at 33 and the receiver is located at 34, the point of incidence of the optical rays on said product being situated at 35. Similarly, on the other side of the product a second emitter is placed at 36 and a second receiver at 37, the point of incidence of the optical rays on the product 31 being located at 38. In the case illustrated, the emission axes 33, 35, 36, 38, and the reception axes 35, 34, 38, 37 of the optical rays situated on either side of the product to be measured are symmetrical relative to the the median plane of the product at 39, 40, perpendicular to the direction of the thickness to be measured, or relative to the point 41 located at the intersection of the straight line 35, 38 with the median plane 39, 40.

If the thickness 32 of the product 31 is assumed equal to zero, there is obtained the arrangement of FIG. 4, wherein the emission axis 33, 35 and the reception axis 38, 37 are situated in the prolongation of each other, as are the emission axis 36, 38 and the reception axis 35, 34. In consequence, the measuring of the times of location of the images registered by the receivers 34 and 37 respectively makes it possible to verify whether the alignment of the axes 33, 35, 38, 37 on one hand and 34, 35, 38, 36 on the other is correct.

According to the invention, the television cameras are advantageously placed in such locations, that each of the emission axes of the optical rays directed on the product whose thickness is to be measured is situated in the object focal plane of the optical system associated with the corresponding camera which is intended to capture the rays.

In the case where the angle of incidence is 45° and the emission axis is located in the object focal plane of the optical system associated with the television camera, the signal obtained by electronic counting is a linear function of the thickness to be measured.

The electronic counting yields a digital signal which is converted into a continuous analogue signal, the analogue signal being related to the thickness to be measured by a well-defined law. In fact, the calculation is used on the metering of the nominal time $t$ corresponding to a nominal thickness $e$. The electronic scanning supplies an indication different from that of the nominal time, and this time variation $\Delta t$, which enables the corresponding thickness variation $\Delta e$ to be calculated by an expression of the form: $\Delta t = k \Delta e$. It then suffices to effect the algebraic addition of the nominal thickness $e$ and of the thickness variation $\Delta e$ to obtain the thickness required.

It has been previously stated that a temporal correspondence is maintained between the scanning of the sensitive faces of each of the two cameras, which makes it possible to locate by electronic metering the position of the images of each of the selected points.

To achieve a correct count, it is necessary for the metering to start with an image on one of the two sensitive surfaces and to terminate with the other image on the second sensitive surface. Consequently, it is necessary that the start signal for the electronic counting appears before the end-of-the-count signal, which may be ensured by reserving for the starting signal a scanning zone coinciding, for example, with the upper half of the sensitive surface of the first camera, and reserving for the end-of-count signal an equal scanning zone coinciding with the lower half of the sensitive surface of the second camera. However, this would mean the sacrificing of half of the available sensitive surfaces and consequently a resolution reduced by half for a given scale, or a scale diminished by half for a given resolution.

To overcome these drawbacks, there is established in the course of the scanning of the sensitive surfaces of the cameras contact between that of the two systems effecting the scanning which is reserved for the start and the electronic counter, and contact between the second scanning system and the said counter is interrupted in order to allow the start of the time count and its progress until the end of the scanning of first sensitive surface. At this instant, the contact between the second scanning system and the counter is reestablished, in such a manner that the counting is continued proportionally to the scanning of the second sensitive surface and terminates on the appropriate signal of this second scanning without any interference by the first scanning.

When the nominal thickness of the product varies, the optical circuits for emission and reception located on one side of the body can be displaced over a distance corresponding in magnitude and direction to the variation of nominal thickness.

I claim:

1. A reflective method of measuring the thickness of a body comprising the steps of selecting a point on the surface of each side of the body whose thickness is to be measured, the two points being substantially located on a normal to the median plane of the body; producing optical rays, directing them towards each point along an axis of incidence and collecting a high proportion of those optical rays reflected from each point along an axis of capture in the form of a beam, each point being in a plane tangential to the respective surface of the body and the two tangential planes being substantially parallel to each other, the axes of incidence being angularly related to said tangential planes; directing each beam of optical rays to intersect a common plane to form an image in said common plane; and measuring the distance between the images in said common plane, said distance being indicative of the thickness of the body.

2. A method of measuring the thickness of a body comprising the steps of providing an emitter on opposite sides of the body and directing optical rays respectively from each emitter to a point on the body on each opposite side thereof, the two points being substantially located on a normal to the median plane of the body, the ray path from each emitter to each point defining an axis of incidence and the optical rays reflected from each point defining an axis of capture, each point being in a plane tangential to the respective surface of the body and the two tangential planes are substantially parallel to each other; the axes of incidence being angularly related to the tangential planes collecting a high proportion of the optical rays reflected from each point by a first and second television camera; focusing the optical rays along each axis of capture by a focusing optical system so that the sensitive surface of each television camera is in the focal image plane of each focusing optical system so that the images are positioned in a well-defined area of the sensitive surface; electronically scanning and determining the time of the scan on each sensitive surface and maintaining a temporal correspondence between the scanning of each sensitive surface to determine the thickness of the body.

3. Apparatus for optically determining the thickness of a body by reflection comprising at least one emitter for producing optical rays; means for directing at least a portion of the optical rays to each of two points located on opposite sides on the body respectively so that the rays strike at an angle with respect to the opposite sides means for collecting the optical rays which are reflected from each of the two points in separate distinct beams; means for directing each beam to intersect a common plane; and means for measuring the distance between images resulting from the intersection of each beam with the common plane.

4. A method according to claim 1 wherein when the body to be measured is displaced relative to its usual position the representative images of said points each undergo a displacement of identical amplitude and direction.

5. A method according to claim 1 wherein the axis of capture is symmetrical with the axis of incidence relative to said normal to the median plane of the body.

6. A method according to claim 1 wherein the axis of incidence forms an angle of 45° with said normal to the median plane of the body passing through the points.

7. A method according to claim 1, further including the step of focusing the optical rays on each of the two points selected to determine the thickness of the body to be measured.

8. A method according to claim 1 wherein directed optical rays are used for the purpose of increasing the density of the luminous energy applied during the measurement.

9. A method according to claim 1 wherein monochromatic optical rays are used.

10. A method according to claim 1 wherein said beams are focused on said common plane to reduce the image area.

11. A method according to claim 1 wherein said measuring step consists in placing a graduated reticle system in the common plane and counting the number of scale divisions between the two images.

12. A method according to claim 1 wherein said measuring step consists in capturing these images and displaying them on a graduated reticle.

13. A method according to claim 1 wherein said measuring step consists in capturing the images and displaying them of a television screen on the same horizontal line continuously electronically scanning said line; measuring the time required by the electronic scanning to pass from one image to the other; and converting this measure of time into a measure of thickness.

14. A method according to claim 1 wherein said measuring step consists in capturing the images and displaying them on a television screen on the same vertical line continuously electronically scanning of the whole of said television screen; measuring the time required by the electronic scanning to pass from one image to the other; and converting this measure of time into a measure of thickness.

15. A method according to claim 2 wherein the axes of incidence and capture of the optical rays located on either side of the body whose thickness is to be measured are symmetrical relative to the median plane of the body perpendicular to the direction of the thickness to be measured.

16. A method according to claim 2 wherein the time of the scan is determined separately for each sensitive surface.

17. A method according to claim 2 wherein when the nominal thickness of the product varies, the optical ray paths situated on one side of the body are displaced by a distance corresponding in magnitude and direction to the aforesaid variation of the nominal thickness.

18. A method according to claim 1, comprising the further steps when the body to be measured is at a higher temperature than the environment of flowing air over the paths of the optical rays directed towards the body to be measured and emanating therefrom in such a manner that the rays pass through a medium having a uniform refractive index.

19. A method as claimed in claim 2, comprising the further steps when the body to be measured is at a higher temperature than the environment of flowing air over the paths of the optical rays directed towards the body to be measured and emanating therefrom in such a manner that the rays pass through a medium having a uniform refractive index.

20. An apparatus according to claim 3 wherein the optical ray emitter consists of two lasers, each laser directing the optical rays to one of the two points.

21. An apparatus according to claim 20 wherein the two lasers are of substantially equal power.

22. An apparatus according to claim 3 wherein the optical ray emitter consists of a single laser, including two mirrors, the beam of which is directed into its two mirrors which have the same coefficient of transmissivity, with consequent emission of two radiations of optical rays of substantially equal intensity.

23. An apparatus according to claim 3 wherein the means for directing the optical rays consist of at least one focusing lens for each side of the body, the focal points of each coinciding with each point of the body to be measured.

24. An apparatus according to claim 3 wherein the optical ray emitter comprises two lasers, each laser directing its optical rays of the two points, and wherein the means for collecting the optical rays emanating from each of the two points in the form of two distinct beams consists of at least one focusing lens having an aperture such that the ratio between the laser radiations retransmitted by the surface and the intrinsic radiation of the body is at a maximum.

25. An apparatus according to claim 3 wherein the means for measuring the distance between the images consists of a viewer fitted with a micrometric reticle eyepiece.

26. An apparatus according to claim 3 wherein the means for measuring the distance between the images consists of at least one television camera.

27. The method according to claim 1 comprising the further step of verifying the alignment of the axes by having the two points on which the optical rays are directed coincide.

* * * * *